UNITED STATES PATENT OFFICE.

GEORGE C. BEIDLER, OF OKLAHOMA, OKLAHOMA.

PHOTOGRAPHING AND DEVELOPING APPARATUS.

1,057,397.  Specification of Letters Patent.  Patented Mar. 25, 1913.

Application filed March 23, 1907. Serial No. 364,015.

*To all whom it may concern:*

Be it known that I, GEORGE C. BEIDLER, citizen of the United States of America, residing at Oklahoma city, in the county of Oklahoma and State of Oklahoma, have invented certain new and useful Improvements in Photographing and Developing Apparatus, of which the following is a specification.

This invention relates to printing and developing apparatus and refers more particularly to an apparatus designed primarily for reproducing writings, drawings, pictures, or the like, novel means being also provided to convey the sensitized film through a series of receptacles containing suitable developing and fixing fluids or through suitable baths according to the requirements.

A preferred form of construction of my apparatus will be herein described, but it is to be understood that this particular form is shown only for the purpose of illustrating one embodiment of the invention.

It is an object of this invention to provide an apparatus which will be simple in construction, efficient in practice and economical to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views in which—

Figure 1, is a longitudinal vertical sectional view through the casing with parts in elevation; and Fig. 2, is a plan view of the apparatus with the top of the casing removed.

In these drawings A, denotes a suitable casing supported in any manner desired containing a compartment B, adapted to contain sensitized paper, preferably in roll form. The roll W is suitably mounted to rotate and the paper drawn from the roll is projected through the top of the compartment between the rollers $b$, and then directed to travel over the top of the said compartment between the rollers D, into the compartment E. There is an exposure chamber F, above the compartments and a suitable camera G, is provided for taking the picture, there being an angularly disposed mirror H, in the exposure chamber for reflecting the image onto the sensitized paper or film heretofore referred to.

The compartment E, is provided with a series of pans or tanks I, J, and J', and these tanks may be multiplied to suit the requirements of practice to contain the several liquids required in fixing and developing the exposed films.

In order to draw the film through the several compartments, I provide a mechanism consisting of a shaft K, having toothed wheels L, which mesh with a rack M, the said rack being suitably guided in the compartment E, and being alternately reciprocated through the rotation of the shaft K, in opposite directions. When the shaft is turned to the right, the said rack will be projected from the compartment until the inner end thereof is nearly above the shaft K. When the shaft is rotated in the opposite direction, the said rack will, of course, be retracted and thrust into the compartment. It is the purpose of this invention that the said rack shall carry clips N, which are designed to clamp on the edges of the film Y and as the said rack is moved outwardly, the film is carried through the several tanks as indicated. The clips are automatically released and set through the contact with trips within the casing in the path of travel of said clips. The trips just referred to are preferably near the ends of the casing and consist of pins $m$ and $n$, projecting preferably transversely of the casing above one side of the rack and as there is a clip N, on each side of the rack, the said clips are moved in unison by reason of the connecting rod N'. From an inspection of the drawing it will be observed that the upper end of the lever $N^2$ for operating the clip, comes in contact with the pin $n$, when the rack has reached the limit of its forward movement and hence said lever is thrown into engagement with the end of the clip to close the jaws of said clip and the parts will remain in this relation until the rack has traveled to nearly the limit of its outward movement when the upper end of the lever will strike the pin $m$, thus moving the said lever out of engagement with the end of the clip and releasing the clip to permit the discharge of the paper into the receptacle J'. After the paper is cut by the knife O, it is desirable to move the next succeeding film portion a short distance beyond the knife in order that it may

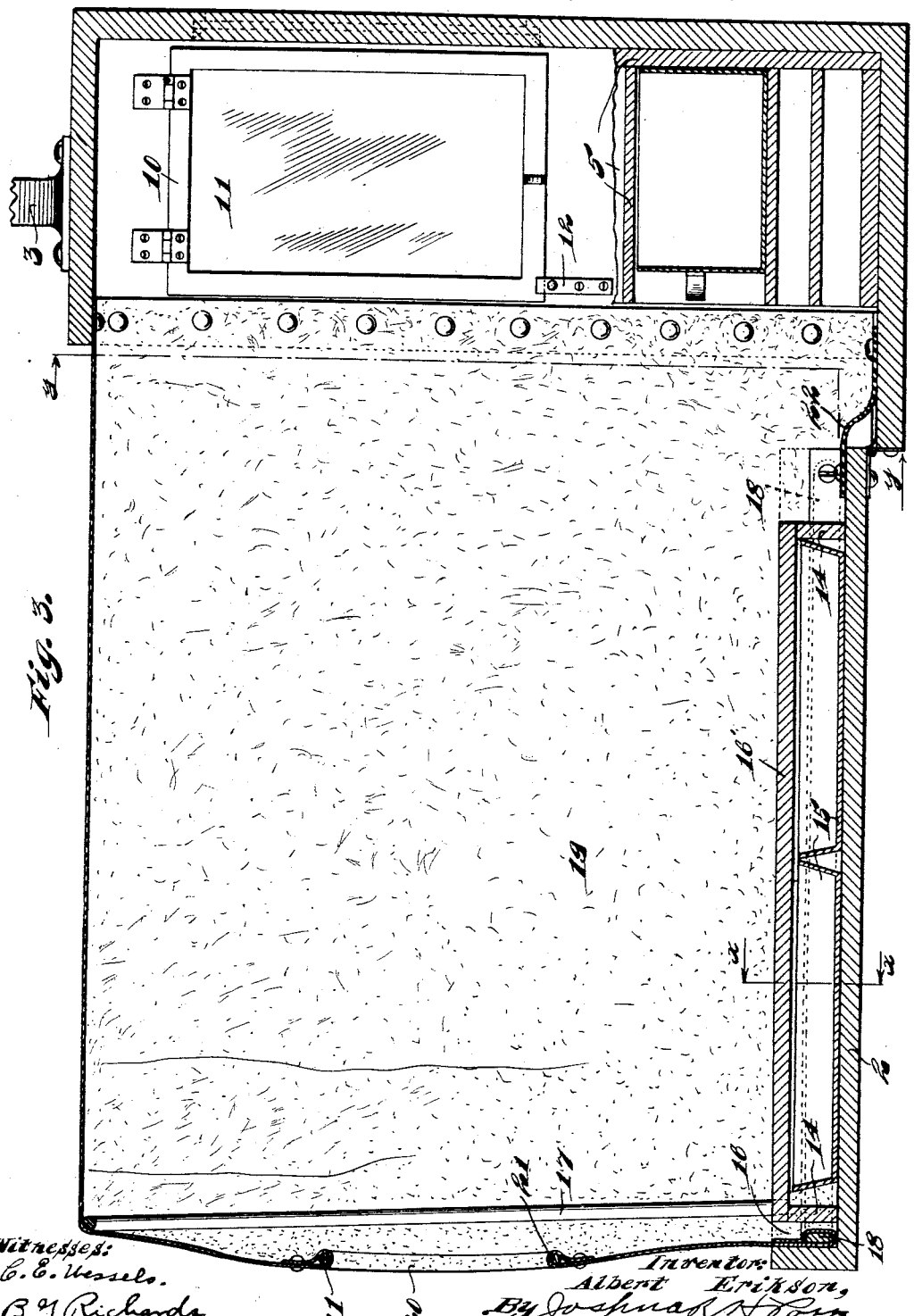

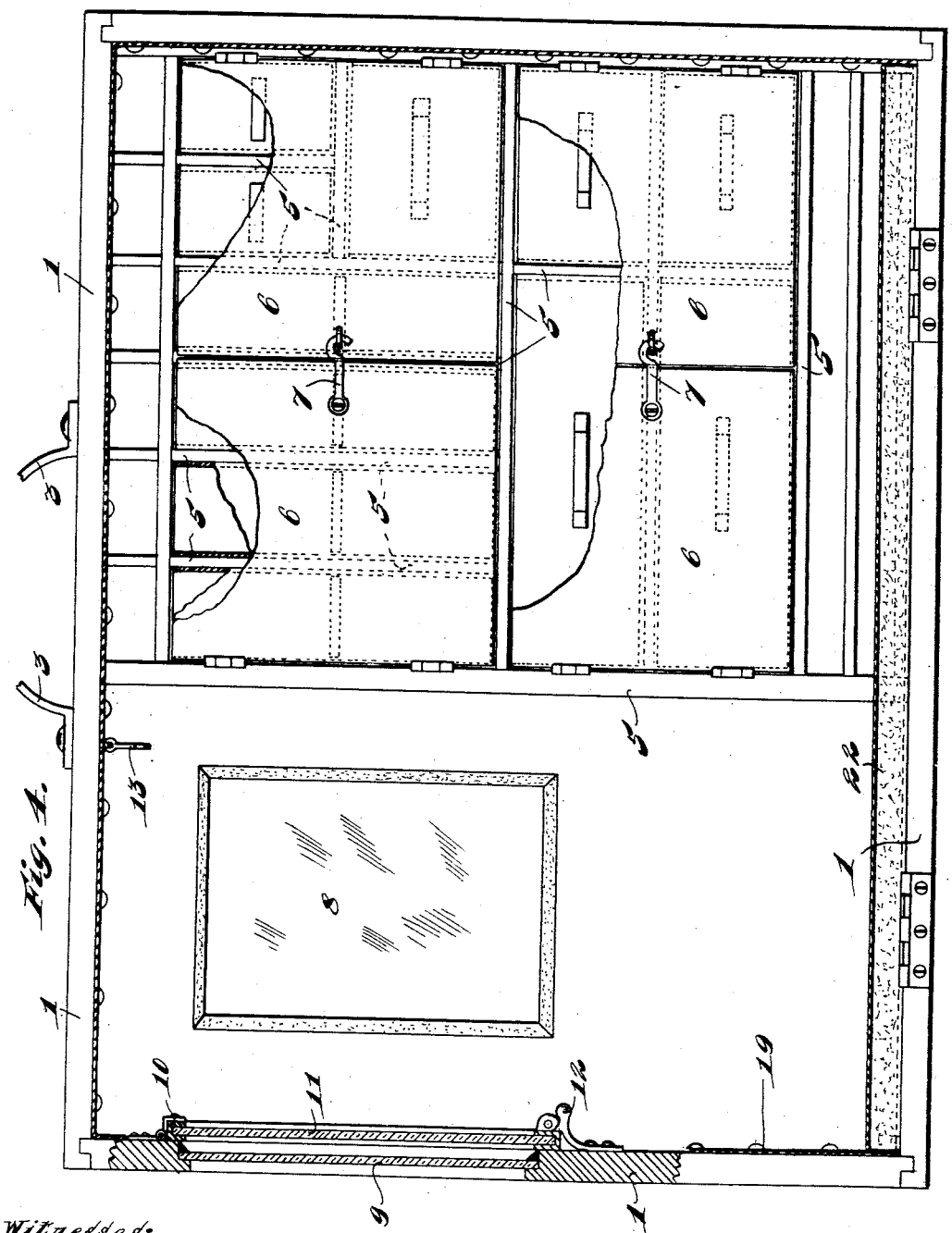

UNITED STATES PATENT OFFICE.

ALBERT ERIKSON, OF CHICAGO, ILLINOIS.

PHOTOGRAPHER'S CABINET.

1,057,417.  Specification of Letters Patent.  Patented Apr. 1, 1913.

Application filed May 27, 1912. Serial No. 699,922.

*To all whom it may concern:*

Be it known that I, ALBERT ERIKSON, a citizen of the United States, and a resident of the city of Chicago, county of Cook, and State of Illinois, have invented certain new and useful Improvements in Photographers' Cabinets, of which the following is a specification.

My invention relates to improvements in photographers' cabinets, and has for its object the provision of a cabinet of this character which is portable and may be employed as a dark room for developing plates, and which is of simple construction and efficient in use.

The invention consists in the combinations and arrangements of parts hereinafter described and claimed.

The invention will be best understood by reference to the accompanying drawings forming a part of this specification, and in which—

Figure 1 is a perspective view of a cabinet embodying my invention, Fig. 2, a section taken on line $x$—$x$ of Fig. 3, Fig. 3, a vertical longitudinal section of the cabinet shown in position for use, and Fig. 4, a section taken on line $y$—$y$ of Fig. 3.

The preferred form of construction, as illustrated in the drawings, comprises a casing 1 provided with a hinged closure 2 adapted to serve as a supporting tray when in open position. Casing 1 is provided with a suitable handle 3, and suitable latches 4 are provided for securing closure 2 in closed position. Casing 1 is divided by suitable partitions 5 into suitable compartments for the reception of the different chemicals and supplies employed by a photographer. Suitable doors 6 are provided for some of these compartments, and latches 7 serve to secure said doors in closed positions. A red glass window 8 is provided in one wall of casing 1, and a clear glass window 9 is provided in another wall thereof. A swinging frame 10 is arranged within casing 1 over window 9 and is provided with a red glass light 11 adapted to cover window 9, as shown. Suitable latches 12 and 13 are provided for holding frame 10 in position over window 9 or in inoperative position. By this arrangement it will be observed that ample red light will be admitted to the casing for the operator's convenience and that, when desired, frame 11 may be swung upwardly and secured in inoperative position by means of latch 13 so as to admit white light to said casing.

The tray 2 is divided by a plurality of partitions 14 into suitable compartments for the retention of developing trays 15 and a channel 16 adjacent the three edges of said tray, as shown. Foldable covers 16' are provided for said compartments, as indicated. A U-shaped supporting frame 17 has the ends of its limbs pivotally mounted in channel 16 adjacent the outer end of tray 2 in position to permit said frame to be folded into channel 16 or extended, as indicated in Fig. 3. Another U-shaped frame 18 has its limbs pivoted to tray 2 near its inner end so as to permit said frame to fold into channel 16, as indicated in Fig. 3.

A flexible hood 19 has its inner edges secured to casing 1 around the edges of closure 2, when the latter is in closed position, and its lower edges secured to U-shaped frame 18, as indicated. At its outer end hood 19 is provided with an opening 20 adapted to pass over the head and shoulders of an operator, and a draw-string 21 is provided around the edges of opening 20 to serve as a means for drawing the hood tightly around the body of the operator and securing it in this position for the exclusion of light.

A flexible apron 22 is secured to the inner edge of tray 2 and the adjacent portion of casing 1 and serves to prevent the admission of light through the hinged joint between said tray and casing.

In use, casing 1 is placed upon any suitable support and tray 2 opened to the position indicated in Fig. 3, and frame 17 is swung upwardly to the position shown in Fig. 3 so as to hold the hood 19 in distended position. Then the head and shoulders of the operator are passed through opening 20 and the edges of said opening are drawn and secured to the body of the operator by means of draw-string 21. The foldable covers 16' will constitute a convenient table for his operations, and the compartments in the casing 1 will be found of ready access. When it is desired to develop the plates, cover 16 may be readily lifted and folded to give access to trays 15 for this purpose. After the completion of the developing, frame 10 may be swung to inoperative position to admit white light for the purpose of inspecting the plate. When it is desired to obtain ready access to the casing without regard to the nature of the light admitted thereto, frame 17 is lowered into its folded position and frame 18 elevated, thus lifting the hood 19 out of the way.

The construction set forth will be found to be strong and durable and highly efficient in use.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention, what I claim as new and desire to secure by Letters Patent, is:

1. The combination of a casing having its front sides composed substantially of a hinged closure constituting a supporting tray; and a flexible hood secured to said casing around the top and each side of said closure and to each side and the free edge of said tray and adapted to pass over the head and shoulders of an operator and give access to said casing, substantially as described.

2. The combination of a casing having its front sides composed substantially of a hinged closure constituting a supporting tray; a flexible hood secured to said casing around the top and each side of said closure and to each side and the free edge of said tray and adapted to pass over the head and shoulders of an operator and give access to said casing; and a draw-string at the opening of said hood, substantially as described.

3. The combination of a casing having its front sides composed substantially of a hinged closure constituting a supporting tray; a flexible hood secured to said casing around the top and each side of said closure and to each side and the free edge of said tray and adapted to pass over the head and shoulders of an operator and give access to said casing; and a U-shaped supporting frame pivoted to and foldable in said tray and adapted to hold said hood in distended position, substantially as described.

4. The combination of a casing having a hinged closure constituting a supporting tray; partitions dividing said casing into compartments; a foldable top for said tray; and a flexible hood secured to said casing around said closure and to said tray and adapted to pass over the head and shoulders of an operator and give access to said casing, substantially as described.

5. The combination of a casing having a hinged closure constituting a supporting tray; a clear glass window in said casing; a removable frame provided with a red glass and arranged over said window on the inside; and a flexible hood secured to said casing around said closure and to said tray and adapted to pass over the head and shoulders of an operator and give access to said casing, substantially as described.

6. The combination of a casing having a hinged closure constituting a supporting tray; a U-shaped frame having the ends of its limbs pivoted in said tray adjacent its hinged end and foldable into said tray; and a flexible hood secured to said casing around said closure and to said U-shaped frame and adapted to pass over the head and shoulders of an operator and give access to said casing, substantially as described.

7. The combination of a casing having a hinged closure constituting a supporting tray; a U-shaped frame having the ends of its limbs pivoted in said tray adjacent its hinged end and foldable into said tray; a flexible hood secured to said casing around said closure and to said U-shaped frame and adapted to pass over the head and shoulders of an operator and give access to said casing; and a U-shaped supporting frame having the ends of its limbs pivoted to said tray near its outer end and foldable into said tray, substantially as described.

8. The combination of a casing having a hinged closure constituting a supporting tray; a flexible sealing apron secured to said closure and said casing and covering the hinged joint therebetween; a U-shaped frame having the ends of its limbs pivoted in said tray adjacent its hinged end and foldable into said tray; and a flexible hood secured to said casing around said closure and to said U-shaped frame and adapted to pass over the head and shoulders of an operator and give access to said casing, substantially as described.

9. The combination of a casing having a hinged closure constituting a supporting tray; a flexible sealing apron secured to said closure and said casing and covering the hinged joint therebetween; a U-shaped frame having the ends of its limbs pivoted to said tray adjacent its hinged end and foldable into said tray; a flexible hood secured to said casing around said closure and to said U-shaped frame and adapted to pass over the head and shoulders of an operator and give access to said casing; and a U-shaped supporting frame having the ends of its limbs pivoted to said tray near its outer end and foldable into said tray, substantially as described.

In testimony whereof I have signed my name to this specification in the presence of two subscribing witnesses.

ALBERT ERIKSON.

Witnesses:
 JOSHUA R. H. POTTS,
 J. SIMONS.

Copies of this patent may be obtained for five cents each, by addressing the "Commissioner of Patents. Washington, D. C."